United States Patent [19]

Noguchi et al.

[11] Patent Number: 4,653,694

[45] Date of Patent: Mar. 31, 1987

[54] INTERMITTENT TYPE SWIRL INJECTION NOZZLE

[75] Inventors: Masaaki Noguchi; Masaharu Sumiyoshi; Yujiro Oshima, all of Aichi, Japan

[73] Assignee: K. K. Toyota Chuo Kenkyusho, Aichi, Japan

[21] Appl. No.: 733,816

[22] Filed: May 14, 1985

[30] Foreign Application Priority Data

May 14, 1984 [JP] Japan ................. 59-70216[U]

[51] Int. Cl.$^4$ ........................................... F02M 61/00
[52] U.S. Cl. ................... 239/533.12; 239/464; 239/473
[58] Field of Search ............ 239/533.3–533.12, 239/585, 460, 464, 472–476, 482, 487–488, 468, 417.3, 434.5, 405, 406, 399; 431/186

[56] References Cited

U.S. PATENT DOCUMENTS

| | | | |
|---|---|---|---|
| 1,079,335 | 11/1913 | Hardic | 239/473 |
| 1,252,254 | 1/1918 | Fisher | 239/584 |
| 1,343,780 | 6/1920 | Hull | 239/473 |
| 2,613,998 | 10/1952 | Noon et al. | 239/464 |
| 2,774,629 | 12/1956 | Noon et al. | 239/464 X |
| 3,838,821 | 10/1974 | Berlyn | 239/533.7 |
| 4,060,199 | 11/1977 | Burn et al. | 239/585 X |
| 4,179,069 | 12/1979 | Knapp et al. | 239/585 X |
| 4,205,790 | 6/1980 | Keiczek | 239/533.4 |
| 4,213,568 | 7/1980 | Hofmann | 239/533.4 |
| 4,360,161 | 12/1982 | Claxton et al. | 239/585 X |
| 4,365,746 | 12/1982 | Tanasawa et al. | 239/533.12 X |
| 4,467,965 | 8/1984 | Shinner | 239/533.12 X |
| 4,526,143 | 7/1985 | Oshima | 239/474 X |

*Primary Examiner*—Joseph F. Peters, Jr.
*Assistant Examiner*—Kevin Patrick Weldon
*Attorney, Agent, or Firm*—Sughrue, Mion, Zinn, Macpeak & Seas

[57] ABSTRACT

In an intermittent type swirl injection nozzle including a nozzle body having a through hole and a spray hole, a needle valve inserted into the through hole, and a partition member of a cylindrical shape fittedly and fixedly inserted into the through hole, a gap area between the needle valve and the partition member is increased in accordance with the lift of the needle valve. For this purpose, a tapered portion and a top end face are provided on the partition member in a manner that they contact with a tapered portion and a step portion provided on the needle valve when the needle valve is in a position to close the spray hole. The resultant injection nozzle has a variable injection rate and spray angle.

4 Claims, 6 Drawing Figures

INTERMITTENT TYPE SWIRL INJECTION NOZZLE

BACKGROUND OF THE INVENTION

1. Field of the Invention

The present invention relates to improvements in the intermittent type swirl injection nozzle for atomizing fuel using a tangential passage and a swirl chamber to supply a nearly conical fuel spray through a nozzle hole, and more specifically to an intermittent type swirl injection nozzle which is capable of regulating fuel spray angle, spray penetration (the reach of the spray) and atomization characteristics corresponding to the lift of the needle valve and thus most suitable for use as the swirl injection nozzle designed to improve the performance of a direct-injection internal combustion engine of a single-hole, bowl-in type particularly in terms of reduction in smoke concentration.

2. Description of the Prior Art

The recent tendency is to provide more compact smaller cylinder capacity), higher-speed internal combustion engines for motor vehicles and consequently there has been demand on the introduction of fuel injection systems of renovated performance. In other words, the fuel injection system is required to be always adaptable to each operating condition in order to maintain the optimum performance of the engine in a wide range of operating conditions with regard to the engine speed and the load.

For example, fuel injection systems for diesel engines mainly comprise injection pumps, injection pipes and fuel injection nozzles. It is well known that the spary characteristics of the fuel injection nozzle among them directly affect the performance of the engine.

In the case of a conventional direct injection type internal combustion engine, the fuel injection nozzle is arranged nearly in the center of a recess formed in the top face of the piston to allow fuel to be sprayed radially from a plurality of nozzle holes. The intake swirl generated by the intake valve and the intake passage when air is taken in the engine still exists even in the last stage of compression stroke and forms a fuel-air mixture while pushing the fuel spray in the swirling direction within the recess. The diameter of the recess employed is usually set at 40 to 70% of that of the piston or cylinder. Accordingly, the diameter of the recess, in the case of a small engine whose piston diameter is less than 100 mm, is small and will be made even smaller if the compression ratio has to be greater. As a result, the fuel radially injected out of the plurality of nozzle holes of the fuel injection nozzle collides with the inside wall of the recess and adheres to the wall to form liquid films on the wall surface or remains as coarse large droplets, causing the decrease of effectively combustible air-fuel mixture. Accordingly, the disadvantages include not only decrease in output and fuel-efficiency but also the emitting of smoke.

Although the application of a swirl injection nozzle as one of the fuel injection nozzles to direct-injection engines has been attempted by the present inventors and proved utilizable, it has also been recognized necessary to provide the different spray characteristics of the swirl injection nozzle corresponding to engine operating conditions for obtaining optimum engine performance by forming an ideal fuel-air mixture over a wide range of operation. Accordingly, that recognition has made it essential to develop a swirl injection nozzle capable of providing different spray characteristics depending on engine operation conditions.

In the case of an intermittent type swirl injection nozzle, there are methods of imparting swirling movement of fuel by (A) providing a needle valve 1 with a swirl passage 4 in the periphery thereof as shown in FIG. 1; (B) a tangential port 6 tangentially communicating with a swirl chamber 5 as shown in FIG. 2; and (C) a swirl passage 10 in the periphery of the partition member 9 provided between the inner wall 8 of a nozzle body 7 and the needle valve 1 as shown in FIG. 3. The following description will be made as to the nozzles (A) and (C) as the prior art. Since the nozzle (B) is basically similar to (A) or (C), the description of (B) will be omitted. In the intermittent type swirl injection nozzles A and C, the fuel is swirled in the swirl passages 4, 10 and jetted out of the spray hole before being atomized to form spray. Since the injection nozzles A and C as compared with the standard injection nozzles of hole type and throttle type offer a large spray angle and excellent atomizing characteristics, the reach of the spray is short. In the conventional intermittent type swirl injection nozzles A and C, the spray angle $\alpha$ is enlarged as the lead angle $\theta$ formed by the axial lines of the swirl passages 4, 10 and the needle valve 1 is made larger.

However, because the fuel flow resistance of the swirl passages 4, 10 increases in the conventional intermittent type swirl injection nozzles A and C, the sufficient quantity of spray is unavailable when the internal combustion engine is operated at high speed.

On the other hand, if the injection pressure is raised, the velocity of the fuel flowing through the swirl passages 4, 10 of the conventional intermittent type swirl injection nozzles A and C and the inlet swirl velocity at the spray hole 14 will be increased. Consequently, the spray angle $\alpha$ is larger, which will not allow the penetration to increase. To obtain a satisfactory fuel-air mixture formation in the single-hole bowl-in type direct-injection internal combustion engine wherein fuel is tangentially diagonally injected into the roughly $\frac{3}{4}$ spherical combustion chamber, the penetration of the spray and the divergence angle $\alpha$ must respectively be decreased and increased (40~60°) while the engine is operated at low speed, whereas the penetration must be greater than what is available at the time of low speed operation, with the smaller angle $\alpha$ while the engine is operated at high speed. For these requirements, the fuel injection pump (of line plunger type and distributor type) shows such characteristic that the injection pressure becomes extremely large with the higher engine speed even at the same injection quantity. Accordingly, in a fuel injection system comprising a combination of the intermittent type swirl injection nozzle and fuel injection pump, the lead angle $\theta$ (6~10°) has had to be determined, in consideration of the nozzle characteristics, so as to let the swirl injection nozzle offer a smaller angle $\alpha$(30~40°) at the lower engine speed in order to avoid the conditions that the angle $\alpha$ is excessively large and the penetration is too small at the higher engine speed. In the conventional intermittent type swirl injection nozzles A, C, shown in FIGS. 1 and 3, if the gap $t_o$ between a needle valve 1 and a nozzle hole 2 is set small (normally 4/100–2/100 mm) and if the lead angle $\theta$ (normally 20~60°) is set large, the spray angle $\alpha$ will become as large as 50~60°, allowing the performance of an engine to be improved while it is operated at low speed because the atomization of fuel is bettered and the fuel is prevented from colliding with the wall of the combustion chamber and the density of smoke discharged from the engine is minimized. On the contrary, the flow resistance of the swirl passages 4, 10 increases while the engine is operated at high speed, causing the sufficient quantity of injection to be unavailable, the angle α of divergence to be excessive and the penetration of the spray to be suppressed. As a result, the performance of the engine will be reduced.

On the other hand, if the gap $t_o$ is increased (5/100~8/100 mm), the fuel quantity not allowed to pass through the swirl passages 4, 10 will increase, causing the swirling velocity at the inlet of a spray hole 14 to be reduced and the spray angle α to remain as it is, whereby reduction in the performance of the engine while it is operated at high speed can be prevented except for its operation at low speed. As for the fuel flowing through the gap $t_o$, it is negligible at low engine speed where the injection pressure (fuel pressure) is low because the thickness of the boundary layer is thick but the fuel flow rate in this portion is seen to increase at high engine speed where the injection pressure is increased because the thickness of boundary layer is decreased. Accordingly, to enlarge the spray angle α at low speed operation and decrease the angle α at high speed operation or to obtain a sufficient spray angle α when the injection quantity or needle valve lift is small, it can be accomplished by setting the gap $t_o$ changeable with the lift of the needle valve 1 (with the same injection volume, the lift of the needle valve decreases at the low speed operation, allowing the needle valve lift to reach its maximum value at the medium speed operation, whereby the needle valve lift can be maintained constant even if the engine is operated at higher speed). Thus the gap $t_o$ provided between the needle valve 1 and the valve hole 2 affects the spray angle α and further various kinds of performance of the swirl injection nozzle.

As matter of fact, the present inventors made a series of experiments and analyses in consideration of the aforementioned problems to improve the gap $t_o$, the spray angle, the spray hole and the like and obtain spray characteristics corresponding to internal combustion engine operating conditions.

Although consideration has generally been given to the aforementioned gap $t_o$ only to prevent fuel oil leakage, the present inventors deem such a gap as an essential condition affecting the performance of a swirl injection nozzle. In other words, they have devised an intermittent type swirl injection nozzle for implementing functions heretofore not in existence by establishing a novel method for utilizing the gap as a fuel passage to make the swirl injection nozzle demonstrate its optimum performance in terms of the spray angle, flow rate coefficient and the reach of the spray corresponding to the internal combustion engine operating conditions.

SUMMARY OF THE INVENTION

In view of the foregoing, it is therefore an object of the present invention to provide an intermittent type swirl injection nozzle capable of providing a spray angle, a flow rate coefficient and the reach of spray as desired which can meet internal combustion engine operating conditions by effectively utilizing the aforementioned gap.

It is another object of the present invention to provide a highly efficient intermittent type swirl injection nozzle simple in construction, readily manufactured and installed, offering high accuracy and atomizing characteristics and causing the least pressure loss.

The intermittent type swirl injection nozzle according to the present invention comprises a nozzle body having a through hole formed therein, a spray hole formed at a leading end of the through hole, and a body seat connected to the spray hole; a needle valve inserted into the through hole of the nozzle body slidably in the axial direction of the through hole, the needle valve having a needle seat at a leading end thereof for opening and closing the spray hole; a partition member of a cylindrical shape fittedly and fixedly inserted into the through hole of the nozzle body, the partition member having a hole formed therethrough in which the needle valve is movable and having tangential passage means formed on an outer wall thereof for imparting swirling movement of fuel when the needle valve is lifted to open the spray hole and to spray the fuel in a conical form through the spray hole; and means for increasing a gap area between said needle valve and the partition member in accordance with the lift of the needle valve, thereby providing the injection nozzle with characteristics of a variable injection rate and spray angle.

According to the invention, the means for increasing the gap area comprises a tapered portion provided on an inner wall of the partition member and a top end face of the tapered portion, and a tapered portion provided on an outer periphery of the needle valve and a step portion projected therefrom in a manner to intersect an axial line of the needle valve, the tapered portion and the step portion of the needle valve being substantially in contact with the tapered portion and the top end face of the partition member, respectively, when the needle valve is in a position to close the spray hole.

In the intermittent type swirl injection nozzle thus constructed according to the present invention, the gap area in the contact portion where the hole of the partition member and the needle valve face each other is enlarged in proportion to the lift of the needle valve, so that desired fuel spray characteristics including a spray angle, a flow rate coefficient, the reach of spray, the atomization of the spray and the like corresponding to internal combustion engine operating conditions can be obtained.

Accordingly, the fuel flow jetted out of the intermittent type swirl injection nozzle nearly in a conical form according to the present invention joins an intake air flow to form a desired fuel-air mixture without colliding with the wall of the recess made in the combustion chamber and sticking to the top face of the piston, whereby the penetration of the spray maintained permits the atomized fuel to proceed through the combustion chamber until the combustion is terminated. Accordingly, the fuel spray effectively combusted contributes to output improvement, reduction of fuel cost, solution of the problem attributed to the generation of smoke and decrease in the production of harmful components contained in exhaust gas and combustion noise.

DETAILED DESCRIPTION

Figure 1:
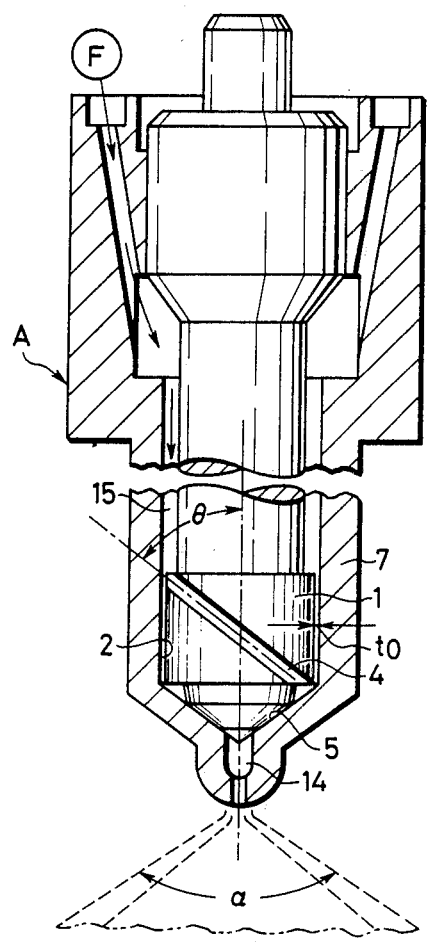
FIGS. 1 through 3 are schematic block diagrams of intermittent type swirl injection nozzles to which the present invention is applied.
Figure 2:
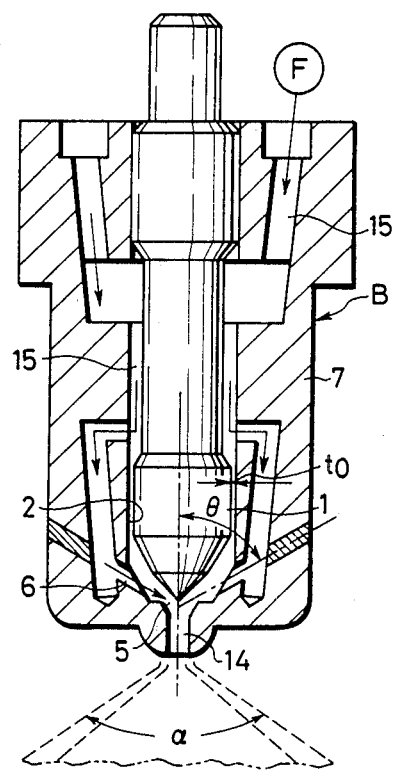
Figure 3:
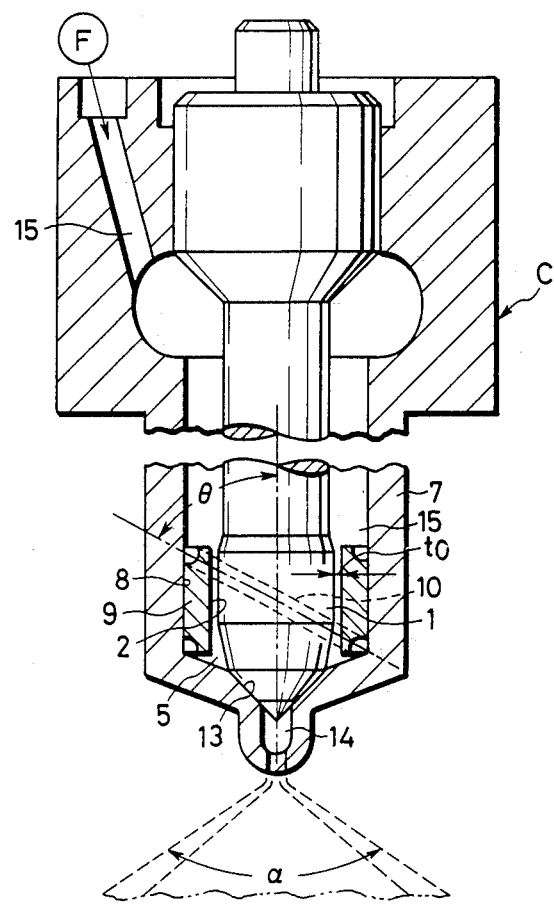
Figure 4:
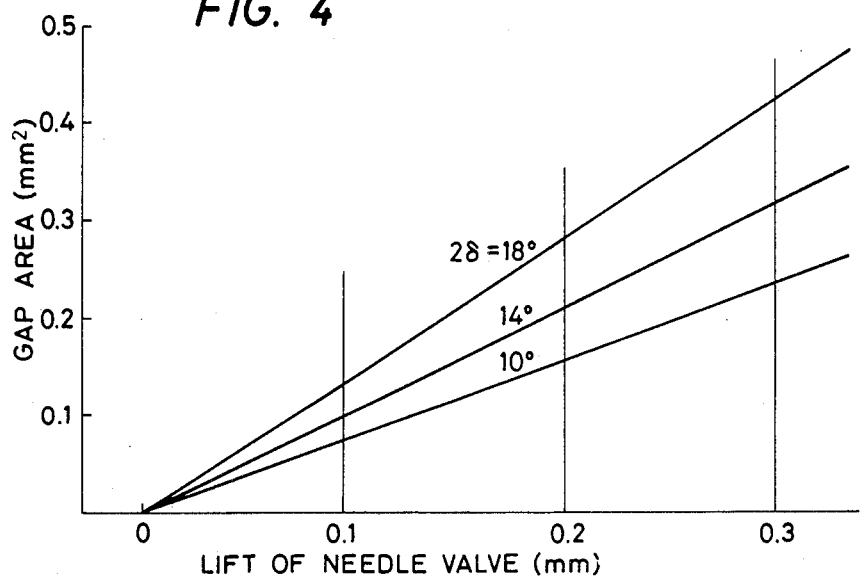
FIG. 4 is a graph representing the characteristics of the intermittent type swirl injection nozzle based on the data obtained.
Figure 5:
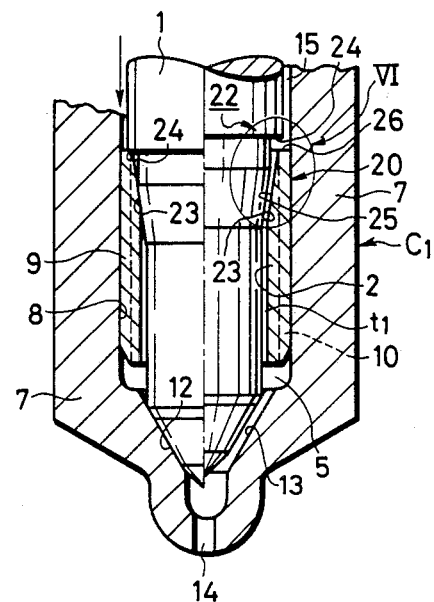
FIGS. 5 and 6 are vertical sections illustrating the cutaway views of the principal portion of the intermittent type swirl injection nozzle embodying the present invention.
Figure 6:
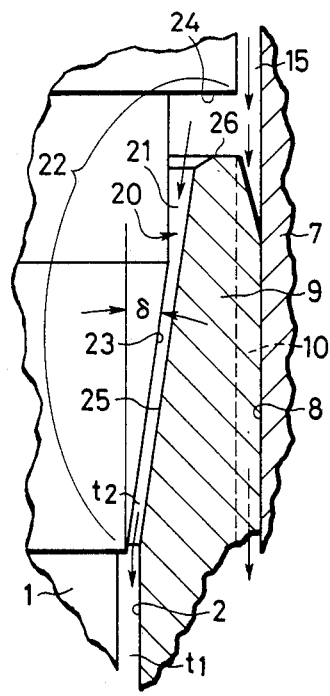

Referring now to FIGS. 4 through 6, the embodiments of the present invention will be described.

The intermittent type swirl injection nozzle according to the present invention comprises a cylindershaped partition member 9 between the inner wall 8 of a nozzle body 7 and the periphery 8 of a needle valve 1, a swirl passage 10 provided in the peripheral portion of the partition member 9 and a through hole 2 slidably contacting the needle valve 1 in the partition member 9. A spiral spring (not shown) is provided in contact with the base and face of the needle valve 1, whereas a conical body seat 13 contacting the conical leading end 12 of the needle valve 1 is provided at the leading end of the inner wall 8. A spray hole 14 is opened from the conical body seat 13 toward the leading end face of the nozzle body 7. An annular swirl chamber 5 is provided for the nozzle body 7 located close to and around the boundary between the cylindrical body of the needle valve 1 and the conical leading end 12 thereof. The communication of the leading end of a supply passage 15 made in the base end face of the nozzle body 7 with the swirl chamber 5 is provided on the periphery of the partition member 9 through the swirl passage 10 as a tangential passage provided along the tangential direction in the outer peripheral face of the swirl chamber 5. In the embodiment of the swirl injection nozzle $C_1$, the needle valve 1 is separated from the body seat 13 in resisting the spiral spring when the pressure of the fuel supplied to the swirl chamber 5 through a supply passage 15 and the swirl passage 10 is raised and the swirl chamber 5 is allowed to communicate with the spray hole 14 through the gap between the leading end 12 of the needle valve 1 and the body seat 13. In the embodiment of the injection nozzle $C_1$, the supply passage 15, the swirl passage 10, the swirl chamber 5, the leading end of the needle valve 1 and the gap between the inner wall 8 and the body seat 13 form a supply passage for swirlingly and spirally supply the fuel to the spray hole 14 while the nozzle is opened.

In the embodiment of the intermittent type injection nozzle $C_1$, there is provided a contact portion 22, where the needle valve 1 and the partition member 9 are substantially contacted with each other while the nozzle is closed, and a gap 21 of the portion 20 where the needle valve 1 and the hole 2 are opposed in the neighborhood of the swirl passage 10. That is, the contact portion comprises, relative to the needle valve 1, a tapered portion 23 provided on the outer periphery thereof and a step 24 intersecting the axial line of the needle valve 1 and, relative to the partition member 9, a tapered portion 25 provided on the hole 2 and the top end face 26 thereof, whereby a stable smooth contact or separation is made possible.

In the embodiment of the swirl injection nozzle $C_1$, consequently, the passage area of the contact portion 22 is gradually increased as the needle valve 1 is lifted and thus the increasing flow rate of the fuel flowing therethrough without swirling can be utilized to narrow the spray angle $\alpha$ slowly.

More specifically, left and right halves to the center line in FIG. 5 respectively represent opened and closed nozzles when the needle valve 1 is not lifted and completely lifted. Since the embodiment of the swirl injection nozzle $C_1$ is provided with the swirl passage 10 in the periphery of the partition member 9 to energize the fuel in the swirling direction and the tapered portion 25 of 14° on the inner periphery of the through hole 2, the gap $t_2$ produced by the tapered portion 25 changes as the needle valve 1 is lifted. The swirl passage 10 provided in the outer periphery of the partition member 9 is determined by the angle $\alpha$ of divergence of the spray required from the shape of the combustion chamber of the engine with the lead angle normally ranging 10~60°, 20° being employed in this embodiment. The angle of the tapered portion 25 becomes larger, as the ratio of the minimum $\theta$min (mm$^3$/st)-to-maximum $\theta$max (mm$^3$/st), that is, injection quantity ratio $\theta$max/$\theta$min of the engine and the ratio Nmax/Nmin of the idling engine speed Nmin to the highest engine speed Nmax become greater. As $\theta$max/$\theta$min for an engine equipped with a supercharger is high, the angle of the tapered portion 25 will become large. Although a range of 5~30° as the angle of the tapered portion is effective, the selection is dependent on engine requirements. FIG. 4 shows the relation between the lift of the needle valve 1 and the passage area of the gap $t_2$ with parameter of the angle($\delta$)of the tapered portion 26 (FIG. 6). The gap 21 formed with the outer periphery of the needle valve 1 and the through hole 2 of the partition member 9 is divided into $t_1$ and $t_2$. The passage area of $t_2$ is equal to or less than that of $t_1$. As for the gap $t_1$ and thd 2, particularly $t_2$ should preferably be zero when the needle valve 1 is not lifted at all. However, because the partition member 9 has been forced to be fitted in the inner wall of the nozzle body 7, the positioning thereof requires accuracy and is not readily be installed therein. In this embodiment of the invention, the tapered portion 23 and the step 24 are provided around the needle valve 1 and accordingly, when the partition member 9 is forced to be fitted in the inner wall 8, the needle valve 1 itself may be used as a jig to allow the partition member 9 to engage therewith and rest in the inner wall 8 under pressure. In so doing, since the partition member 9 can be fixed in the inner wall 8 with the needle valve 1 seated at the body seat 13, the gaps formed with both the tapered portions 23, 25 in the needle valve 1, the step 24 and the end face 26 are automatically nullified, so that the partition member 9 can readily be assembled with accuracy. The advantage of the embodiment of the intermittent type injection nozzle $C_1$ include, when it is mass-produced, the practical availability of various uniform nozzle characteristics and the possibility of controlling the spray angle and the penetration thereof by providing a swirl passage for energizing the fuel flowing the gap in the swirling direction around the inner peripheral wall of the through hole 2 of the partition member 9 or the needle valve 1 to regulate the quantity of the fuel flowing through the gap and the swirl passage 10 provided around the partition member 9.

As set forth above, in the intermittent type swirl injection nozzle according to the present invention, the gap area in the portion close to the swirl passage where the guide hole and the needle valve slidably contact may be increased as the lift volume of the needle valve increases in such a manner as to control or weaken the swirl of the fuel and, if the lift volume of the needle valve increases, the fuel is allowed to pass through the passage area. Consequently, the swirling velocity of the injected fuel as well as its spray angle $\alpha$ is reduced, whereby the characteristics of variable injection rate and variable spray angle can be provided. Accordingly, the injection nozzle suits the purposes of enlarging the fuel spray angle and minimizing the penetration of the spray when the internal combustion engine is operated at low speed or narrowing the fuel spray angle and increasing the penetration at high speed. By arranging the contact portion comprising the tapered and step portions around the needle valve, the needle valve itself as a jig engaging with the partition member can be forced in the inner wall and fixed therein at the position where the needle valve is seated, whereby the gap between the tapered and step portions and the end face in the partition member can automatically be reduced to zero and the partition member can readily be installed with accuracy. Moreover, the intermittent type swirl injection nozzle according to the present invention, when mass-produced, possesses novel features of practical use in that various uniform nozzle characteristics are readily obtainable.

What is claimed is:

1. An intermittent type swirl injection nozzle comprising:
   a nozzle body having a through hole formed therein, a spray hole formed at a leading end of said through hole and a body seat connected to said spray hole;
   a needle valve inserted into said through hole of said nozzle body slidably in the axial direction of said through hole, said needle valve having a needle seat at a ;eading end thereof for opening and closing said spray hole;
   a partition member of a cylindrical shape fittedly and fixedly inserted into said through hole of said nozzle body, and having tangential passage means formed on an outer wall thereof for imparting swirling movement of fuel when said needle valve is lifted to open the spray hole and to spray the fuel in a conical form through the spray hole; and
   a variable gap area formed between a portion of the outer periphery of said needle valve and a portion of an inner wall of said partition member, which portions confront each other in the direction parallel to the axial direction of said needle valve, said variable gap area being increased in accordance with the lift of said needle valve,
   said tangential passage means and said variable gap area commuicating, at their upstream side, with a fuel supply passage and, at their downstream side, with said spray hole, thereby controlling the fuel flow rate between said tangential passage means and said variable gap area in accordance with the lift of said needle valve so as to vary an injection rate and a spray angle.

2. The injection nozzle according to claim 1, wherein said portion of said partition member comprises a tapered portion on its inner wall, and said portion of said needle valve comprises a tapered portion on its outer wall, thereby defining said variable gap area between said tapered portions.

3. The injection nozzle according to claim 2, wherein said needle valve has upstream of said tapered portions a step portion projecting radially to form a surface confronted with a top end face in a direction parallel to the axial direction, and the confronted surface and face defining said variable gap area therebetween.

4. The injection nozzle according to claim 1, wherein said needle valve has, upstream of tapered portions of said partition member and said needle valve, a step portion projecting radially to form a surface confronted with a top end face in a direction parallel to the axial direction, and the confronted surface and face defining said variable gap area therebetween.

* * * * *